United States Patent
Kubozono et al.

(10) Patent No.: US 10,576,766 B2
(45) Date of Patent: Mar. 3, 2020

(54) PRINTING APPARATUS AND PRINTING METHOD THAT CORRECT IMAGE DATA BASED ON A SCANNING RESULT OF AN INSPECTION PATTERN

(71) Applicant: CANON KABUSHIKI KAISHA, Tokyo (JP)

(72) Inventors: Kenji Kubozono, Kawasaki (JP); Takuya Tsunemi, Tokyo (JP); Shinsuke Ikegami, Tokyo (JP); Satoshi Tada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/936,677

(22) Filed: Mar. 27, 2018

(65) Prior Publication Data
US 2018/0290471 A1    Oct. 11, 2018

(30) Foreign Application Priority Data
Apr. 11, 2017    (JP) .................................. 2017-078480

(51) Int. Cl.
*B41J 29/393*    (2006.01)
*B41J 2/21*    (2006.01)
(Continued)

(52) U.S. Cl.
CPC ........... *B41J 29/393* (2013.01); *B41J 2/0451* (2013.01); *B41J 2/2142* (2013.01); *B41J 2/2146* (2013.01);
(Continued)

(58) Field of Classification Search
CPC ...... B41J 2/0451; B41J 2/2142; B41J 2/2146; B41J 29/393; B41J 2029/3935
See application file for complete search history.

(56) References Cited

U.S. PATENT DOCUMENTS 5,946,006 A    8/1999    Tajika et al.
6,587,224 B1    7/2003    Nabeshima et al.
(Continued)

FOREIGN PATENT DOCUMENTS

CN    1716116 A    1/2006
CN    101279542 A    10/2008
(Continued)

OTHER PUBLICATIONS

Extended European Search Report dated Aug. 29, 2018, in European Patent Application No. 18164074.9.
(Continued)

*Primary Examiner* — Scott A Richmond
(74) *Attorney, Agent, or Firm* — Venable LLP

(57) ABSTRACT

A printing apparatus includes a printing unit that prints an image based on image data, and an inspection pattern including a first patch, and a second patch different in color or having the same color and different in density than the first patch, each of the first and second patches being printed so as to extend in the first direction on the printing medium, and the first patch and the second patch being arranged in the second direction. A scanning unit includes a plurality of detection elements arranged in the second direction, and scans the inspection pattern, and a correcting unit corrects the image data based on a scanning result. The scanning unit scans the first patch using a first detection element and scans the second patch by using a second detection element which is farther away from a lens than the first detection element.

7 Claims, 13 Drawing Sheets

(51) Int. Cl.
*B41J 2/045* (2006.01)
*B41J 2/47* (2006.01)
*H04N 1/60* (2006.01)

(52) U.S. Cl.
CPC .............. *B41J 2/47* (2013.01); *H04N 1/6044* (2013.01); *B41J 2029/3935* (2013.01)

(56) References Cited

U.S. PATENT DOCUMENTS

| | | |
|---|---|---|
| 7,432,494 B2 | 10/2008 | Kanzaki |
| 7,503,635 B2 | 3/2009 | Seki et al. |
| 8,585,174 B2 | 11/2013 | Saita |
| 8,721,021 B2 | 5/2014 | Nakajima et al. |
| 8,845,060 B2 | 9/2014 | Azuma et al. |
| 9,498,993 B2 | 11/2016 | Kubozono et al. |
| 2006/0023018 A1* | 2/2006 | Hatayama ............ B41J 2/16579 347/23 |
| 2010/0165022 A1* | 7/2010 | Makuta ................ B41J 2/04508 347/9 |
| 2014/0285822 A1* | 9/2014 | Regelsberger ..... G06K 15/1868 358/1.2 |

FOREIGN PATENT DOCUMENTS

| | | |
|---|---|---|
| CN | 102310634 A | 1/2012 |
| CN | 102343711 A | 2/2012 |
| CN | 103057276 A | 4/2013 |
| CN | 104029510 A | 9/2014 |
| EP | 0 532 248 A2 | 3/1993 |
| EP | 2 583 832 A1 | 4/2013 |
| JP | 2016-034754 A | 3/2016 |

OTHER PUBLICATIONS

Office Action dated Jun. 5, 2019, issued in Chinese Patent Application No. 201810309991.X.

\* cited by examiner

PRINTING APPARATUS AND PRINTING METHOD THAT CORRECT IMAGE DATA BASED ON A SCANNING RESULT OF AN INSPECTION PATTERN

BACKGROUND OF THE INVENTION

Field of the Invention

The present invention relates to a printing apparatus and a printing method.

Description of the Related Art

Conventionally, in an image forming apparatus, there is known an arrangement that forms an image, and then inspects whether an appropriate image is formed by scanning the formed image with an optical sensor.

For example, Japanese Patent Laid-Open No. 2016-34754 describes an arrangement that scans an image printed by a printhead with a plurality of nozzles by using a sensor in which scanning elements (photodiodes) are arrayed in the same direction as a nozzle array direction.

In the arrangement described in Japanese Patent Laid-Open No. 2016-34754, however, a direction of arraying the scanning elements of the sensor is the same as the nozzle array direction, giving a scanning result that includes a variation in scanning elements or a variation in light distribution characteristics when the printed image is scanned by the sensor. Consequently, when, for example, an inspection pattern for inspecting the discharge characteristics of the plurality of nozzles is scanned, different scanning results are obtained even if the discharge characteristics among the nozzles are the same, making it impossible to perform an inspection accurately.

SUMMARY OF THE INVENTION

The present invention reduces the influence of a variation in scanning elements of a sensor or a variation in light distribution characteristics in scanning an image such as an inspection pattern.

According to one aspect of the present invention, there is provided a printing apparatus comprising: a printing unit configured to include a plurality of orifices which discharge ink and are arrayed in a first direction, perform, based on image data indicating an image to be printed, printing by discharging the ink from the plurality of orifices to a printing medium conveyed in a second direction crossing the first direction, and print an inspection pattern including a first patch and a second patch different in color or having the same color and different in density so as to extend in the first direction respectively on the printing medium by the plurality of orifices wherein the first patch and the second patch are arranged in the second direction; a scanning unit configured to include a plurality of detection elements arranged in the second direction, perform scan in the first direction and, scanning the inspection pattern on the printing medium; and a correcting unit configured to correct, based on a scanning result of the inspection pattern by the scanning unit, the image data so as to reduce unevenness in density between areas of image on the printing medium printed by the printing unit in a predetermined direction, wherein the scanning unit scans the first patch by using a first detection element of the plurality of detection elements and scans the second patch by using a second detection element which is another element of the plurality of detection elements, respectively.

According to another aspect of the present invention, there is provided a printing apparatus comprising: a printing unit configured to include a plurality of orifices which discharge ink of a first color and are arrayed in a first direction and a plurality of orifices which discharge ink of a second color and are arrayed in the first direction, perform, based on image data indicating an image to be printed, printing by discharging the ink of the first color and the ink of the second color from the plurality of orifices to a printing medium conveyed in a second direction crossing the first direction, and print an inspection pattern so as to extend in the first direction by the plurality of orifices of the printing unit on the printing medium; a scanning unit configured to include a plurality of detection elements arranged in the second direction, perform scan in the first direction and, during the scan, scan the inspection pattern on the printing medium and a correcting unit configured to correct, based on a scanning result of the inspection pattern by the scanning unit, the image data so as to reduce unevenness in density between areas of image on the printing medium printed by the printing unit in respective in a predetermined direction, wherein the printing unit forms, as the inspection pattern, a plurality of patches of the first color different in density and a plurality of patches of the second color different in density such that the plurality of patches of the first color and the plurality of patches of the second color are arranged in the second direction, and the plurality of patches of the second color are arranged in an area outside a range where the plurality of patches of the first color on the printing medium are formed in the second direction, and the scanning unit scans the plurality of patches of the first color in one scan and scans the plurality of patches of the second color in another scan different from the scan in which the plurality of patches of the first color are scanned.

According to another aspect of the present invention, there is provided a printing method comprising: performing printing, based on image data indicating an image to be printed, by discharging ink from a plurality of orifices which discharge ink and are arrayed in a first direction to a printing medium conveyed in a second direction crossing the first direction by using a printing unit including the plurality of orifices, and printing an inspection pattern including a first patch and a second patch different in color or having the same color and different in density so as to extend in the first direction respectively on the printing medium by the plurality of orifices wherein the first patch and the second patch are arranged in the second direction; performing scan by a scanning unit including a plurality of detection elements arranged in the second direction in the first direction and scanning the inspection pattern on the printing medium; and correcting, based on a scanning result by the scanning unit of the inspection pattern, the image data so as to reduce unevenness in density between areas of image printed on the printing medium by the printing unit in a predetermined direction, wherein in the performing the scan, the first patch is scanned by using a first detection element of the plurality of detection elements, and the second patch is scanned by using a second detection element which is other element of the plurality of detection elements, respectively.

According to another aspect of the present invention, there is provided a printing method comprising: performing printing, based on image data indicating an image to be printed, by discharging ink of the first color and the ink of the second color from a plurality of orifices which discharge ink of a second color and are arrayed in the first direction to a printing medium conveyed in a second direction crossing the first direction by a printing unit including a plurality of orifices, and printing an inspection pattern so as to extend in the first direction by the plurality of orifices of the printing unit on the printing medium, and; performing scan in the first direction by a scanning unit including a plurality of detection elements arranged in the second direction and, during the scan, scanning the inspection pattern on the printing medium; and correcting, based on a scanning result of the inspection pattern by the scanning unit, the image data so as to reduce unevenness in density between areas of image on the printing medium printed by the printing unit in respective in a predetermined direction, wherein in the performing printing, as the inspection pattern, a plurality of patches of the first color different in density and a plurality of patches of the second color different in density are formed such that the plurality of patches of the first color and the plurality of patches of the second color are arranged in the second direction, and the plurality of patches of the second color are arranged in an area outside a range where the plurality of patches of the first color on the printing medium are formed in the second direction, and in the performing the scan, the plurality of patches of the first color in one scan are scanned and the plurality of patches of the second color are scanned in another scan different from the scan in which the plurality of patches of the first color are scanned.

With the above arrangement, it becomes possible to reduce the influence of the variation in scanning elements of the sensor or the variation in light distribution characteristics in scanning the inspection pattern or the like.

Further features of the present invention will become apparent from the following description of exemplary embodiments (with reference to the attached drawings).

DESCRIPTION OF THE EMBODIMENTS

Embodiments of the present invention will be described with reference to the accompanying drawings. Note that the arrangement of a system to be described below is an example, and the present invention is not limited to this.

[System Arrangement]

Figure 1:
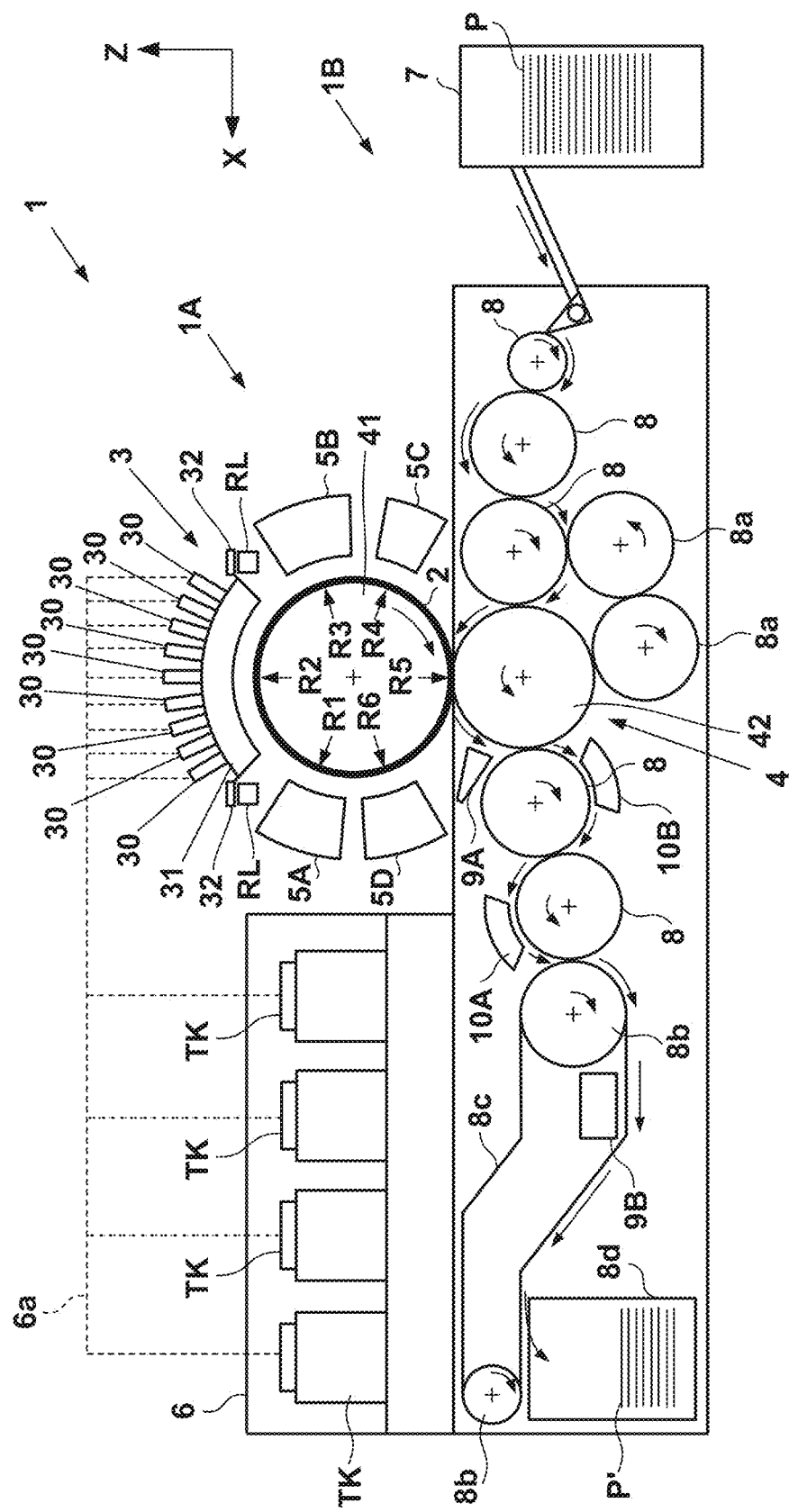
FIG. 1 is a schematic view showing a printing system.

FIG. 1 is a front view schematically showing a printing system 1 according to an embodiment of the present invention. The printing system 1 is a sheet inkjet printer that forms a recorded product P' by transferring an ink image to a printing medium P via a transfer body 2. The printing system 1 includes a printing apparatus 1A and a conveyance apparatus 1B. In this embodiment, an X direction, a Y direction, and a Z direction indicate the widthwise direction (total length direction), the depth direction, and the height direction of the printing system 1, respectively. The printing medium P is conveyed in the X direction.

Note that "print" includes not only formation of significant information such as a character or graphic pattern but also formation of an image, design, or pattern on printing mediums in a broader sense or processing of printing mediums regardless of whether the information is significant or insignificant or has become obvious to allow human visual perception. In this embodiment, "printing mediums" are assumed to be paper sheets but may be fabrics, plastic films, and the like.

An ink component is not particularly limited. In this embodiment, however, a case is assumed in which aqueous pigment ink that includes a pigment as a coloring material, water, and a resin is used.

(Printing Apparatus)

The printing apparatus 1A includes a print unit 3, a transfer unit 4, peripheral units 5A to 5D, and a supply unit 6.

(Print Unit)

The print unit 3 includes a plurality of printheads 30 and a carriage 31. The printheads 30 discharge liquid ink to the transfer body 2 and form ink images of a printed image on the transfer body 2.

In this embodiment, each printhead 30 is a full-line head elongated in the Y direction, and nozzles are arrayed in a range where they cover the width of an image printing area of a printing medium having a usable maximum size. Each printhead 30 has an ink discharge surface with the opened nozzle on its lower surface, and the ink discharge surface faces the surface of the transfer body 2 via a minute gap (for example, several mm). In this embodiment, the transfer body 2 is configured to move in a circular orbit cyclically, and thus the plurality of printheads 30 are arranged radially.

Each nozzle includes a discharge element as a printing element. The discharge element is, for example, an element that generates a pressure in the nozzle and discharges ink in the nozzle, and the technique of an inkjet head in a known inkjet printer is applicable. For example, an element that discharges ink by causing film boiling in ink with an electrothermal transducer and forming a bubble, an element that discharges ink by an electromechanical converting body, an element that discharges ink by using static electricity, or the like can be given as the discharge element. A discharge element that uses the electrothermal transducer can be used from the viewpoint of high-speed and high-density printing.

In the arrangement shown in FIG. 1, nine printheads 30 are provided. The respective printheads 30 discharge different kinds of inks. The different kinds of inks are, for example, different in coloring material and include yellow ink, magenta ink, cyan ink, black ink, and the like. One printhead 30 discharges one kind of ink. However, one printhead 30 may be configured to discharge the plurality of kinds of inks. When the plurality of printheads 30 are thus provided, some of them may discharge ink (for example, clear ink) that does not include a coloring material.

The carriage 31 supports the plurality of printheads 30. The end of each printhead 30 on the side of an ink discharge surface is fixed to the carriage 31. This makes it possible to maintain a gap on the surface between the ink discharge surface and the transfer body 2 more precisely. The carriage 31 is configured to be displaceable while mounting the printheads 30 by the guide of each guide member RL.

(Transfer Unit)

The transfer unit 4 will be described with reference to FIG. 1. The transfer unit 4 includes a transfer drum 41 and a pressurizing drum 42. Each of these drums is a rotating body that rotates about a rotation axis in the Y direction and has a columnar outer peripheral surface. In FIG. 1, arrows shown in respective views of the transfer drum 41 and the pressurizing drum 42 indicate their rotation directions. The transfer drum 41 rotates clockwise, and the pressurizing drum 42 rotates counterclockwise.

The transfer drum 41 is a support member that supports the transfer body 2 on its outer peripheral surface. The transfer body 2 is provided on the outer peripheral surface of the transfer drum 41 continuously or intermittently in a circumferential direction. If the transfer body 2 is provided continuously, it is formed into an endless belt-shape. If the transfer body 2 is provided intermittently, it is formed into belt-shapes with ends divided into a plurality of segments. The respective segments can be arranged in an arc at an equal pitch on the outer peripheral surface of the transfer drum 41.

The transfer body 2 moves cyclically in the circular orbit by rotation of the transfer drum 41. By the rotational phase of the transfer drum 41, the position of the transfer body 2 can be discriminated into a processing area R1 before discharge, a discharge area R2, processing areas R3 and R4 after discharge, a transfer area R5, and a processing area R6 after transfer. The transfer body 2 passes through these areas cyclically.

The processing area R1 before discharge is an area where preprocessing is performed on the transfer body 2 before the print unit 3 discharges ink and an area where the peripheral unit 5A performs processing. In this embodiment, a reactive liquid is applied. The discharge area R2 is a formation area where the print unit 3 forms an ink image by discharging ink onto the transfer body 2. The processing areas R3 and R4 after discharge are processing areas where processing is performed on the ink image after ink discharge. The processing area R3 after discharge is an area where the peripheral unit 5B performs processing, and the processing area R4 after discharge is an area where the peripheral unit 5C performs processing. The transfer area R5 is an area where the transfer unit 4 transfers the ink image on the transfer body 2 to the printing medium P. The processing area R6 after transfer is an area where post processing is performed on the transfer body 2 after transfer and an area where the peripheral unit 5D performs processing.

The outer peripheral surface of the pressurizing drum 42 is pressed against the transfer body 2. At least one grip mechanism which grips the leading edge portion of the printing medium P is provided on the outer peripheral surface of the pressurizing drum 42. A plurality of grip mechanisms may be provided separately in the circumferential direction of the pressurizing drum 42. The ink image on the transfer body 2 is transferred to the printing medium P when it passes through a nip portion between the pressurizing drum 42 and the transfer body 2 while being conveyed in tight contact with the outer peripheral surface of the pressurizing drum 42.

(Peripheral Unit)

The peripheral units 5A to 5D are arranged around the transfer drum 41. In this embodiment, the peripheral units 5A to 5D are an application unit, an absorption unit, a heating unit, and a cleaning unit in order.

The application unit 5A is a mechanism which applies the reactive liquid onto the transfer body 2 before the print unit 3 discharges ink. The reactive liquid is a liquid that contains a component increasing an ink viscosity.

The absorption unit 5B is a mechanism which absorbs a liquid component from the ink image on the transfer body 2 before transfer. It is possible to suppress, for example, a blur of an image printed on the printing medium P by decreasing the liquid component of the ink image. Describing a decrease in liquid component from another point of view, it is also possible to represent it as condensing ink that forms the ink image on the transfer body 2. Condensing the ink means increasing the content of a solid content such as a coloring material or a resin included in the ink with respect to the liquid component by decreasing the liquid component included in the ink.

The absorption unit 5B includes, for example, a liquid absorbing member that decreases the amount of the liquid component of the ink image by contacting the ink image. The liquid absorbing member may be formed on the outer peripheral surface of the roller or may be formed into an endless sheet-like shape and run cyclically.

The heating unit 5C is a mechanism which heats the ink image on the transfer body 2 before transfer. A resin in the ink image melts by heating the ink image, improving transferability to the printing medium P.

The cleaning unit 5D is a mechanism which cleans the transfer body 2 after transfer. The cleaning unit 5D removes ink remaining on the transfer body 2, dust on the transfer body 2, or the like. The peripheral unit 5D can use a known method, for example, a method of bringing a porous member into contact with the transfer body 2, a method of scraping the surface of the transfer body 2 with a brush, a method of scratching the surface of the transfer body 2 with a blade, or the like as needed. A known shape such as a roller shape or a web shape can be used for a cleaning member used for cleaning.

As described above, in the arrangement of FIG. 1, the application unit 5A, the absorption unit 5B, the heating unit 5C, and the cleaning unit 5D are included as the peripheral units. However, cooling functions of the transfer body 2 may be applied, or cooling units may be added to some of these units.

(Supply Unit)

The supply unit 6 is a mechanism which supplies ink to each printhead 30 of the print unit 3. The supply unit 6 may be provided on the rear side of the printing system 1. The supply unit 6 includes a reservoir TK that reserves ink for each kind of ink. Each reservoir TK may be made of a main tank and a sub tank. Each reservoir TK and a corresponding one of the printheads 30 communicate with each other by a liquid passageway 6a, and ink is supplied from the reservoir TK to the printhead 30.

(Conveyance Apparatus)

The conveyance apparatus 1B is an apparatus that feeds the printing medium P to the transfer unit 4 and discharges, from the transfer unit 4, the recorded product P' to which the ink image is transferred. The conveyance apparatus 1B includes a feeding unit 7, a plurality of conveyance drums 8 and 8a, two sprockets 8b, a chain 8c, and a collection unit 8d. In FIG. 1, an arrow inside a view of each constituent element in the conveyance apparatus 1B indicates a rotation direction of the constituent element, and an arrow outside the view of each constituent element indicates a conveyance pass of the printing medium P or the recorded product P'. The printing medium P is conveyed from the feeding unit 7 to the transfer unit 4, and the recorded product P' is conveyed from the transfer unit 4 to the collection unit 8d. The side of the feeding unit 7 may be referred to as an upstream side in a conveyance direction, and the side of the collection unit 8d may be referred to as a downstream side.

The feeding unit 7 includes a stacking unit where the plurality of printing mediums P are stacked and a feeding mechanism which feeds the printing mediums P one by one from the stacking unit to the uppermost conveyance drum 8. Each of the conveyance drums 8 and 8a is a rotating body that rotates about the rotation axis in the Y direction and has a columnar outer peripheral surface. At least one grip mechanism which grips the leading edge portion of the printing medium P (or the recorded product P') is provided on the outer peripheral surface of each of the conveyance drums 8 and 8a. A gripping operation and release operation of each grip mechanism may be controlled such that the printing medium P is transferred between the adjacent conveyance drums.

The two conveyance drums 8a are used to reverse the printing medium P. When the printing medium P undergoes double-side printing, it is not transferred to the conveyance drum 8 adjacent on the downstream side but transferred to the conveyance drums 8a from the pressurizing drum 42 after transfer onto the surface. The printing medium P is reversed via the two conveyance drums 8a and transferred to the pressurizing drum 42 again via the conveyance drums 8 on the upstream side of the pressurizing drum 42. Consequently, the reverse surface of the printing medium P faces the transfer drum 41, and the ink image is transferred to the reverse surface.

(Post Processing Unit)

The conveyance apparatus 1B includes post processing units 10A and 10B. The post processing units 10A and 10B are mechanisms which are arranged on the downstream side of the transfer unit 4, and perform post processing on the recorded product P'. The post processing unit 10A performs processing on the obverse surface of the recorded product P', and the post processing unit 10B performs processing on the reverse surface of the recorded product P'. For example, coating that aims at protection, improving glossiness, and the like, of an image on the image printed surface of the recorded product P' can be used as one of processing performed by the post processing units 10A and 10B. For example, liquid application, sheet welding, lamination, and the like, can be used as coating contents.

(Inspection Unit)

The conveyance apparatus 1B includes inspection units 9A and 9B. The inspection units 9A and 9B are mechanisms which are arranged on the downstream side of the transfer unit 4, and inspect the recorded product P'.

In the arrangement of FIG. 1, the inspection unit 9A is an image capturing apparatus that captures an image printed on the recorded product P' and includes an image sensor, for example, a CCD sensor, a CMOS sensor, or the like. The inspection unit 9A captures a printed image while a printing operation is performed continuously. Based on the image captured by the inspection unit 9A, it is possible to confirm a change over time in tint or the like of the printed image and determine whether to correct image data or print data. In this embodiment, the inspection unit 9A has an imaging range set on the outer peripheral surface of the pressurizing drum 42 and is arranged to be able to partially capture the printed image immediately after transfer. The inspection unit 9A may inspect all printed images or may inspect the images every predetermined sheets.

In the arrangement of FIG. 1, the inspection unit 9B is also an image capturing apparatus that captures an image printed on the recorded product P' and includes an image sensor, for example, a CCD sensor, a CMOS sensor, or the like. The inspection unit 9B captures a printed image in a test printing operation. The inspection unit 9B can capture the entire printed image. Based on the image captured by the inspection unit 9B, it is possible to perform basic settings for various correction operations regarding print data. In this embodiment, the inspection unit 9B is arranged at a position to capture the recorded product P' conveyed by the chain 8c. When the inspection unit 9B captures the printed image, it captures the entire image by temporarily suspending the run of the chain 8c. The inspection unit 9B may be a scanner that scans the recorded product P'.

(Control Unit)

Figure 2:
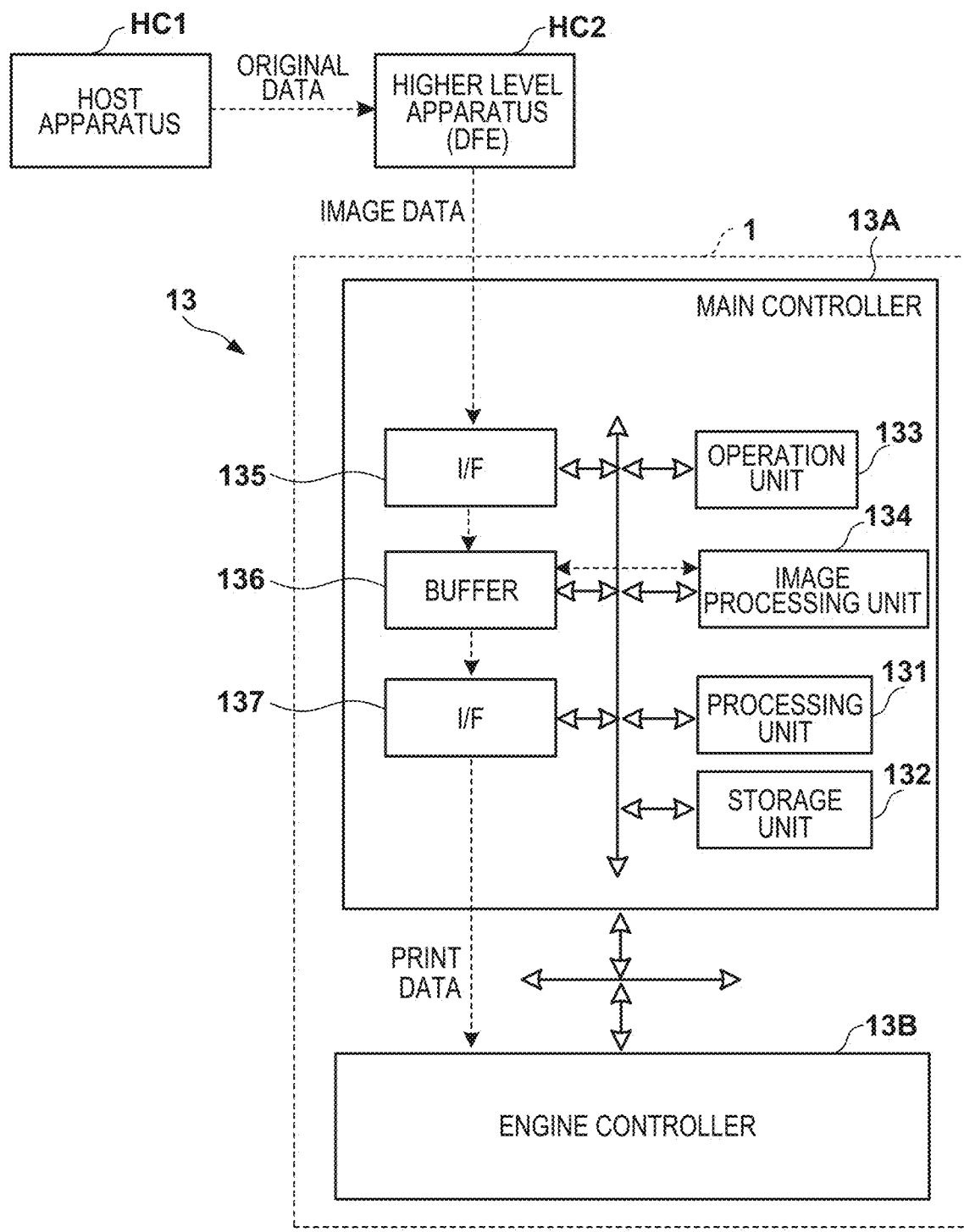
FIG. 2 is a block diagram showing a control system of the printing system.
Figure 3:
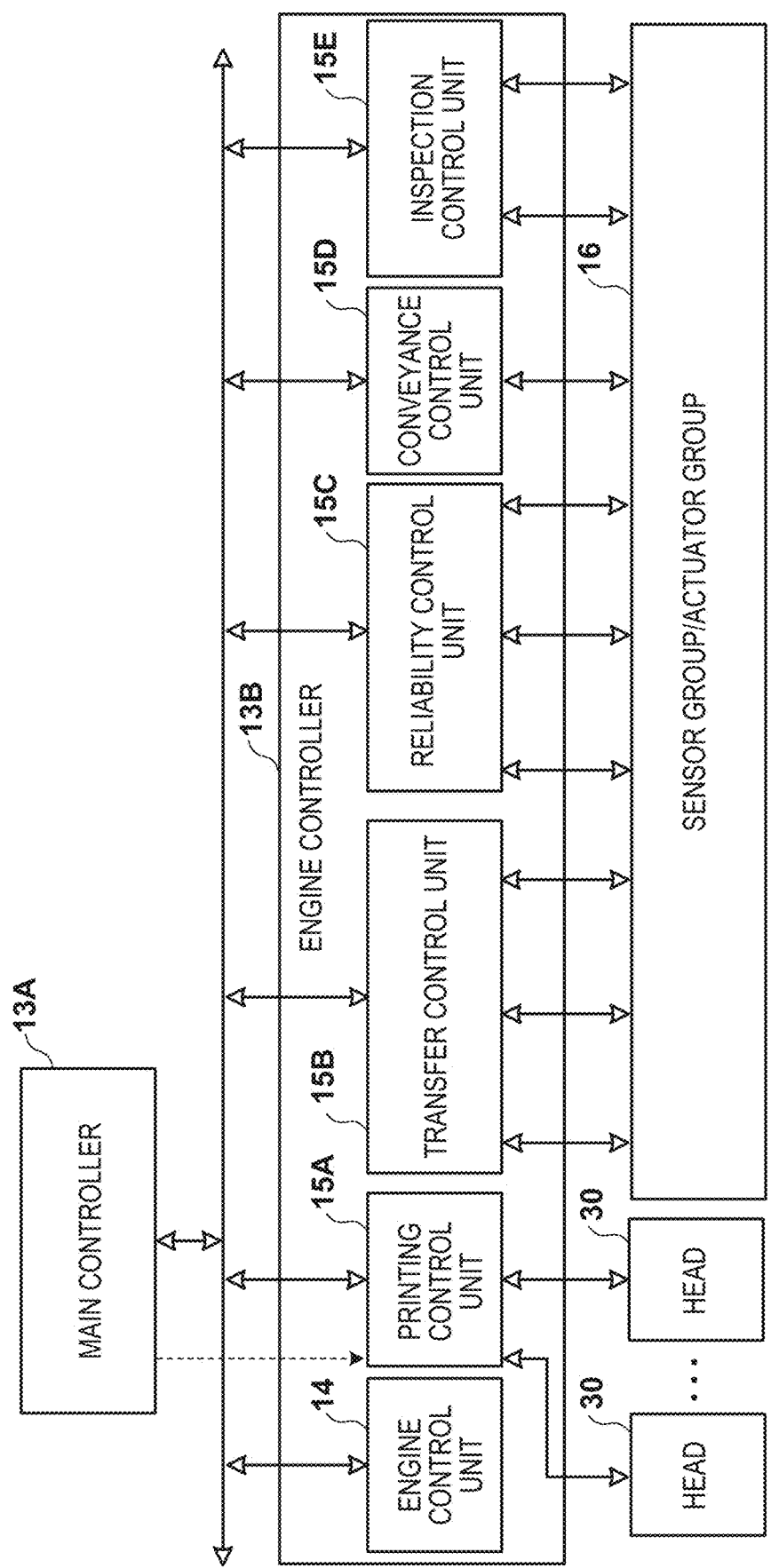
FIG. 3 is a block diagram showing the control system of the printing system.

A control unit of the printing system 1 will be described next. FIGS. 2 and 3 are block diagrams each showing a control unit 13 of the printing system 1. The control unit 13 is communicably connected to a higher level apparatus (DFE) HC2, and the higher level apparatus HC2 is communicably connected to a host apparatus HC1.

Original data to be the source of a printed image is generated or saved in the host apparatus HC1. The original data here is generated in the format of, for example, an electronic file such as a document file or an image file. This original data is transmitted to the higher level apparatus HC2. In the higher level apparatus HC2, the received original data is converted into a data format (for example, RGB data that represents an image by RGB) available by the control unit 13. The converted data is transmitted from the higher level apparatus HC2 to the control unit 13 as image data. The control unit 13 starts a printing operation based on the received image data.

In this embodiment, the control unit 13 is roughly divided into a main controller 13A and an engine controller 13B. The main controller 13A includes a processing unit 131, a storage unit 132, an operation unit 133, an image processing unit 134, a communication I/F (interface) 135, a buffer 136, and a communication I/F 137.

The processing unit 131 is a processor such as a CPU, and executes programs stored in the storage unit 132, and controls the entire main controller 13A. The storage unit 132 is a storage device such as a RAM, a ROM, a hard disk, or an SSD, and stores data and the programs executed by the CPU, and provides the CPU with a work area. The operation unit 133 is, for example, an input device such as a touch panel, a keyboard, or a mouse and accepts a user instruction.

The image processing unit 134 is, for example, an electronic circuit including an image processing processor. The buffer 136 is, for example, a RAM, a hard disk, or an SSD. The communication I/F 135 communicates with the higher level apparatus HC2, and the communication I/F 137 communicates with the engine controller 13B. In FIG. 2, broken-line arrows exemplify the processing sequence of image data. Image data received from the higher level apparatus HC2 via the communication I/F 135 is accumulated in the buffer 136. The image processing unit 134 reads out the image data from the buffer 136, performs predetermined image processing on the readout image data, and stores the processed data in the buffer 136 again. The image data after the image processing stored in the buffer 136 is transmitted from the communication I/F 137 to the engine controller 13B as print data used by a print engine.

As shown in FIG. 3, the engine controller 13B includes control units 14 and 15A to 15E, obtains a detection result of a sensor group/actuator group 16 of the printing system 1, and controls driving of the groups. Each of these control units includes a processor such as a CPU, a storage device such as a RAM or a ROM, and an interface with an external device. Note that the division of the control units is an example, and a plurality of subdivided control units may perform some of control operations or conversely, the plurality of control units may be integrated with each other, and one control unit may be configured to implement their control contents.

The engine control unit 14 controls the entire engine controller 13B. The printing control unit 15A converts print data received from the main controller 13A into raster data or the like in a data format suitable for driving of the printheads 30. The printing control unit 15A controls discharge of each printhead 30.

The transfer control unit 15B controls the application unit 5A, the absorption unit 5B, the heating unit 5C, and the cleaning unit 5D.

The reliability control unit 15C controls the supply unit 6, the recovery unit 12, and a driving mechanism which moves the print unit 3 between the discharge position POS1 and the recovery position POS3.

The conveyance control unit 15D controls driving of the transfer unit 4 and controls the conveyance apparatus 1B. The inspection control unit 15E controls the inspection unit 9B and the inspection unit 9A.

First Embodiment

An inspection unit according to the first embodiment will be described below. In this embodiment, an optical carriage to be illustrated below will be described as a part of the inspection unit 9B shown in FIG. 1. However, the present invention is not limited to this arrangement.

[Arrangement of Optical Carriage]

Figure 4:
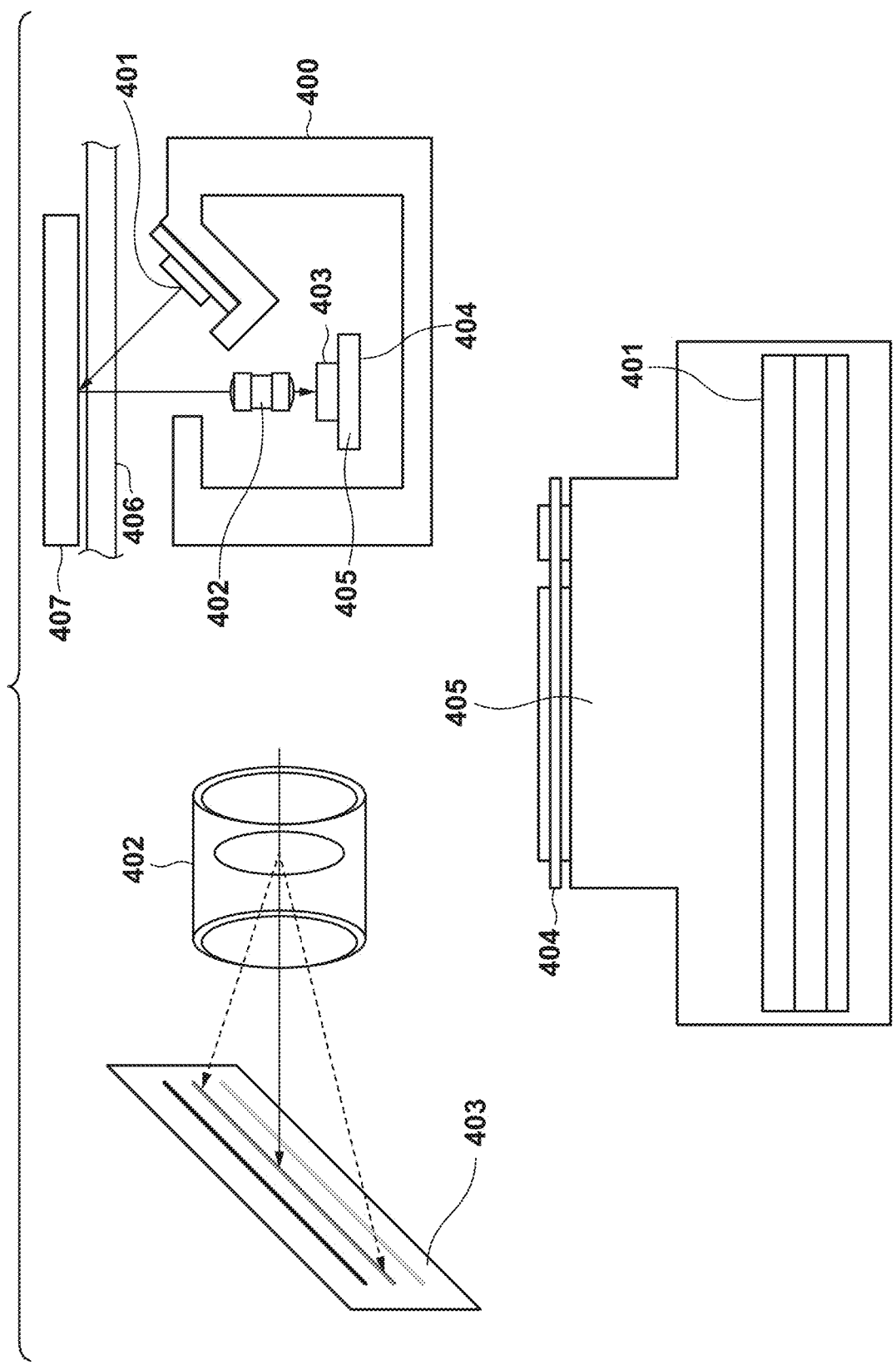
FIG. 4 shows views of an example of the arrangement of an optical carriage according to the first embodiment.

FIG. 4 shows views of an example of the arrangement of an optical carriage 400 included in an inspection unit 9B according to this embodiment. In this embodiment, an example of a reduction optical system using a CCD (Charge Coupled Devices) scanning sensor as a line sensor will be described.

A recorded product is arranged at a predetermined position on a conveyance path as an object to be scanned by the optical carriage 400, performing a scanning operation. In this embodiment, printheads 30 form a predetermined inspection pattern on the recorded product.

The optical carriage 400 according to this embodiment is configured to be movable in a predetermined direction and include a light source 401, a lens 402, a sensor 403, a sensor substrate 404, and an optical box 405.

In FIG. 4, a scanning position by the optical carriage 400 is arranged on a light-transmitting glass 406 such that light emitted by the light source 401 reaches a recorded product 407. When reflected light from the recorded product 407 reaches the lens 402 of the optical carriage 400, it is converged by the lens 402 and guided to the sensor 403. Light scanned by the sensor 403 reaches the optical box 405 via the sensor substrate 404. The sensor 403 detects the intensity of received light and outputs it as a signal.

Figure 5:
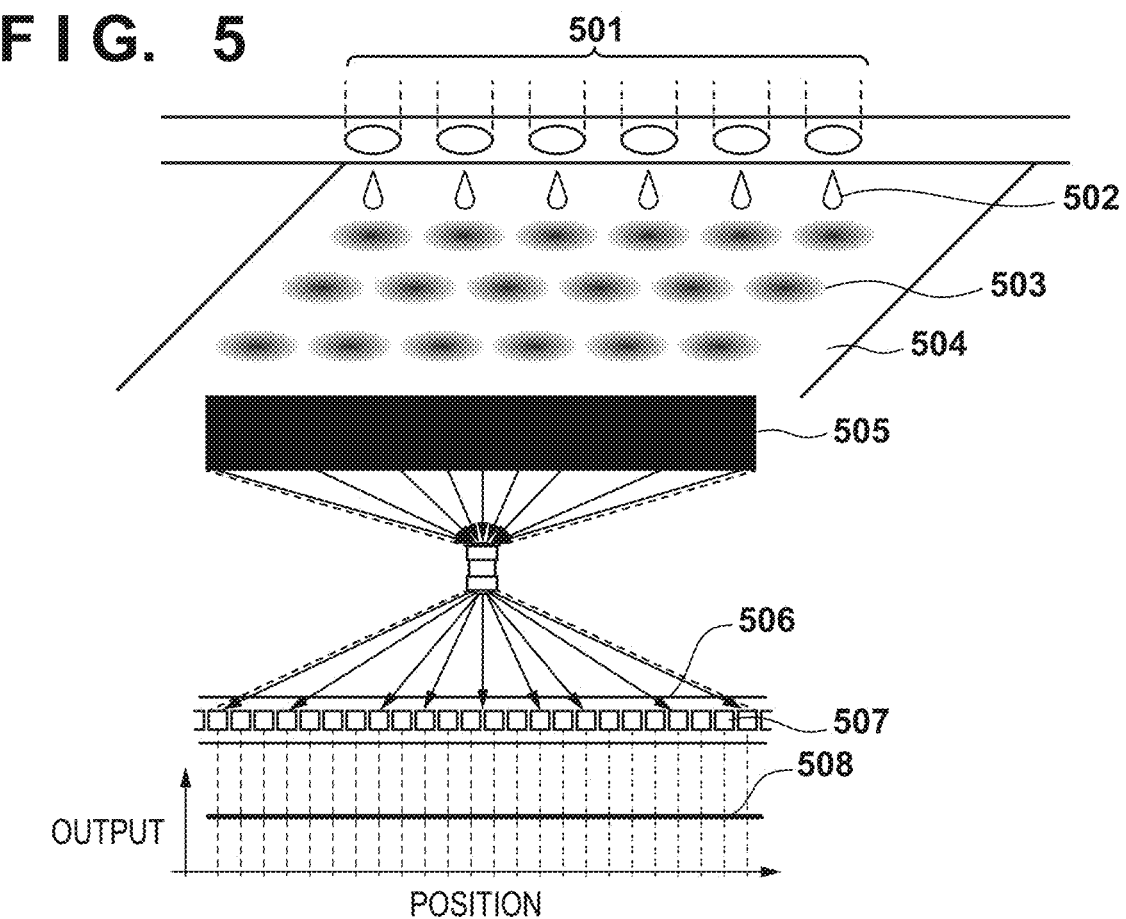
FIG. 5 shows a view and a graph of an arrangement that scans an ideally formed patch by the optical carriage.
Figure 6:
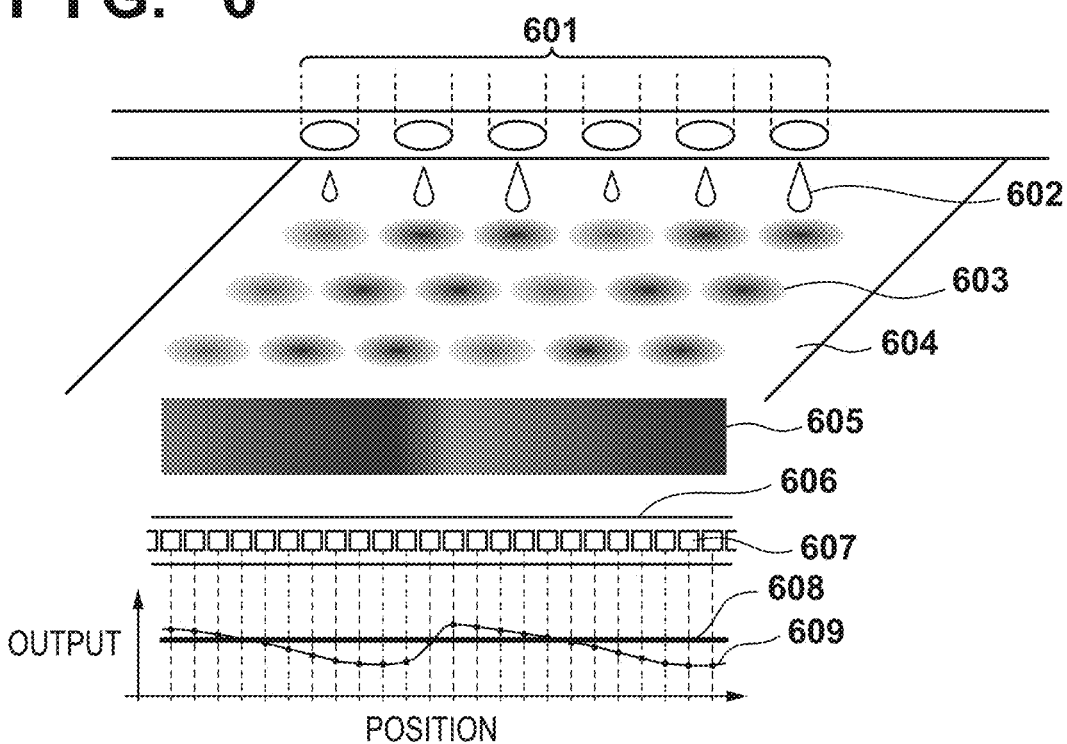
FIG. 6 shows a view and a graph of an arrangement that scans a path with a variation by the optical carriage.

Each of FIGS. 5 and 6 shows a view and a graph of an outline when the optical carriage 400 scans a recorded product where an image is formed. FIG. 5 shows the view and the graph for explaining image formation as an ideal state. FIG. 6 shows the view and the graph for explaining actual image formation.

In an inkjet image forming apparatus, ink discharged by nozzles of printheads lands on a printing medium such as paper, forming an image. The resolution of the image here is decided by the array density of nozzles of the printheads. When the sensor scans the recorded product, the recorded product is irradiated with the light from the light source, and a plurality of detection units of a scanning means detect reflected light. In this embodiment, photodiodes are provided as scanning elements of the detection units. The sensor shown in each of FIGS. 5 and 6 is arranged while being fixed to the conveyance path and sequentially scans images of the recorded product 407 on the conveyance path.

First, in FIG. 5, forming a solid coated image by one color ink is considered. In this case, based on the same image signal, ink 502 is discharged in the same amount from all nozzles (nozzles 501 in an ideal state) in the same state and lands on a printing medium 504 in the same state (inks 503). Consequently, an ideal image 505 free from color unevenness or the like owing to a variation in discharge amount or discharge direction and formed by a plurality of uniform dots is output on the printing medium 504. If an ideal sensor 506 (that is, a plurality of photodiodes 507 that form the sensor 506) scans this image 505, a predetermined output (ideal output 508) is obtained regardless of a position.

In contrast, a recorded product where an image is formed actually is as shown in FIG. 6. In actual image formation, even if the same image signal is input, for example, a variation in amounts or directions of discharged ink 602, or a shift in landing positions on a printing medium 604 may occur (inks 603) in accordance with the states of nozzles 601 or the like. As a result, the density of an output image may not be uniform. If an ideal sensor 606 (that is, a plurality of photodiodes 607 that form the sensor 606) scans this image 605, an output (actual output 609) which is different from an ideal output 608 and changes in accordance with the positions of the nozzles 601 is obtained.

Figure 7:
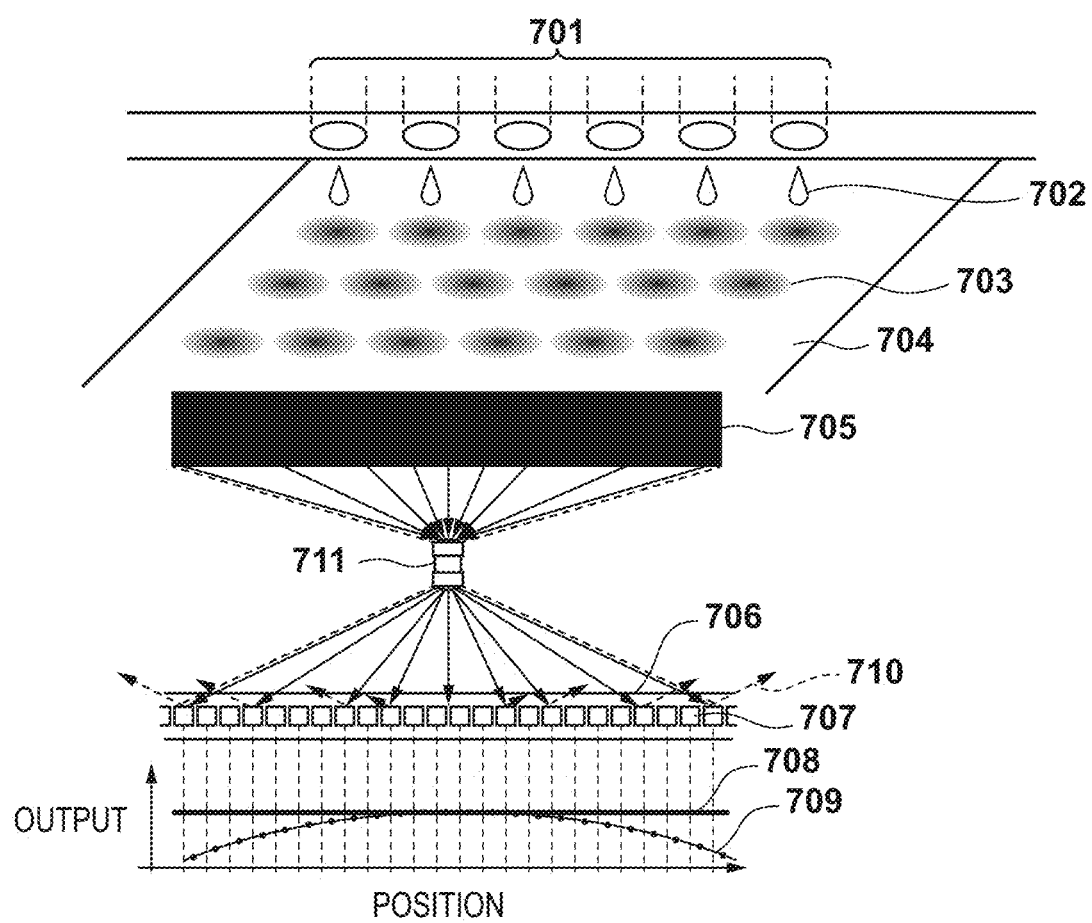
FIG. 7 shows a view and a graph for explaining the characteristics of a sensor according to the first embodiment.

Furthermore, a problem according to a color to be detected, which has been revealed by studies conducted by the present inventors, will be described. First, FIG. 7 shows an inspection patch when an image 705 is formed ideally as shown in FIG. 5. That is, reference numerals 701 to 705 of FIG. 7 are the same as reference numerals 501 to 505 shown in FIG. 5. If a sensor 706 (that is, a plurality of photodiodes 707 that form the sensor 706) scans the image 705, it is found that an output value changes in accordance with the positions of the photodiodes 707 with respect to a lens 711 even if the image 705 formed in the same ideal state is scanned. This is because of a variation in light distribution characteristics that, as shown in FIG. 7, the output value decreases as the photodiodes 707 serving as scanning elements are separated from a position facing the lens 711 as the characteristics of a reduction optical system. This variation in light distribution characteristics is caused due to the fact that some of light beams directed toward the photodiodes 707 via the lens 711 are reflected by the photodiodes 707 and the surface of its peripheral structure due to optical characteristics. That is, some of the light beams from the lens 711 are generated as reflected light beams 710.

In this case, the same output value as an ideal output 708 is obtained in the photodiode 707 facing almost the same position as the center of the lens 711, and the output value decreases as the photodiode is positioned farther away from the center of the lens 711. As a result, a value such as an output value 709 is obtained. It is also found that this phenomenon is not always confirmed in images of all colors, but is recognized only in an image of a specific color. A print unit of this embodiment uses color inks of C (cyan), M (magenta), Y (yellow), and K (black). A description will be made by taking, as an example, a case in which the aforementioned decrease in output image is recognized when a patch formed by using Y ink is scanned.

It is found that such a difference in output value owing to the positions of the photodiodes occurs not only in an image formed by using the Y ink but also in an image formed by using ink of another color instead of using the Y ink depending on the combination of elements that form a sensor. Moreover, in an image forming apparatus compatible with a plurality of inks, the aforementioned phenomenon may occur when a color mixture image formed by using a plurality of color inks is scanned.

[Carriage Operation]

Figure 11:
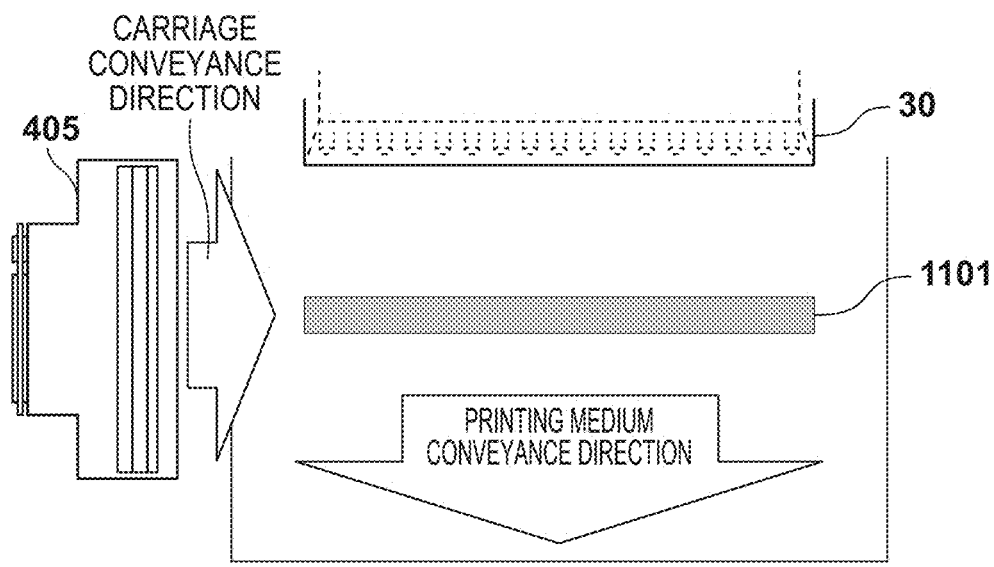
FIG. 11 is a view for explaining an operation according to the first embodiment.

The operation of the optical carriage 400 as the characteristic arrangement of this embodiment will be described next. As shown in FIG. 11, the optical carriage 400 where the sensor 403 is arranged is configured to be movable in a direction crossing the conveyance direction of the printing medium. In this embodiment, the optical carriage 400 is configured to be movable in the same direction as a direction in which the printheads 30 are arrayed. Moreover, as shown in FIG. 1, the printheads 30 adopt a full-line arrangement in which a plurality of printheads are arranged in parallel for each ink color.

A description will be given here by using the printheads 30 corresponding to the inks of C (cyan), M (magenta), and Y (yellow), and printheads corresponding to the respective inks will be referred to as printheads 30C, 30M, and 30Y. In each printhead 30, a plurality of nozzles each for discharging ink and printing elements corresponding to these are arranged along the conveyance direction of the optical carriage 400. Therefore, in each printhead 30, a printing element array is arranged along the conveyance direction of the optical carriage 400.

Figure 8:
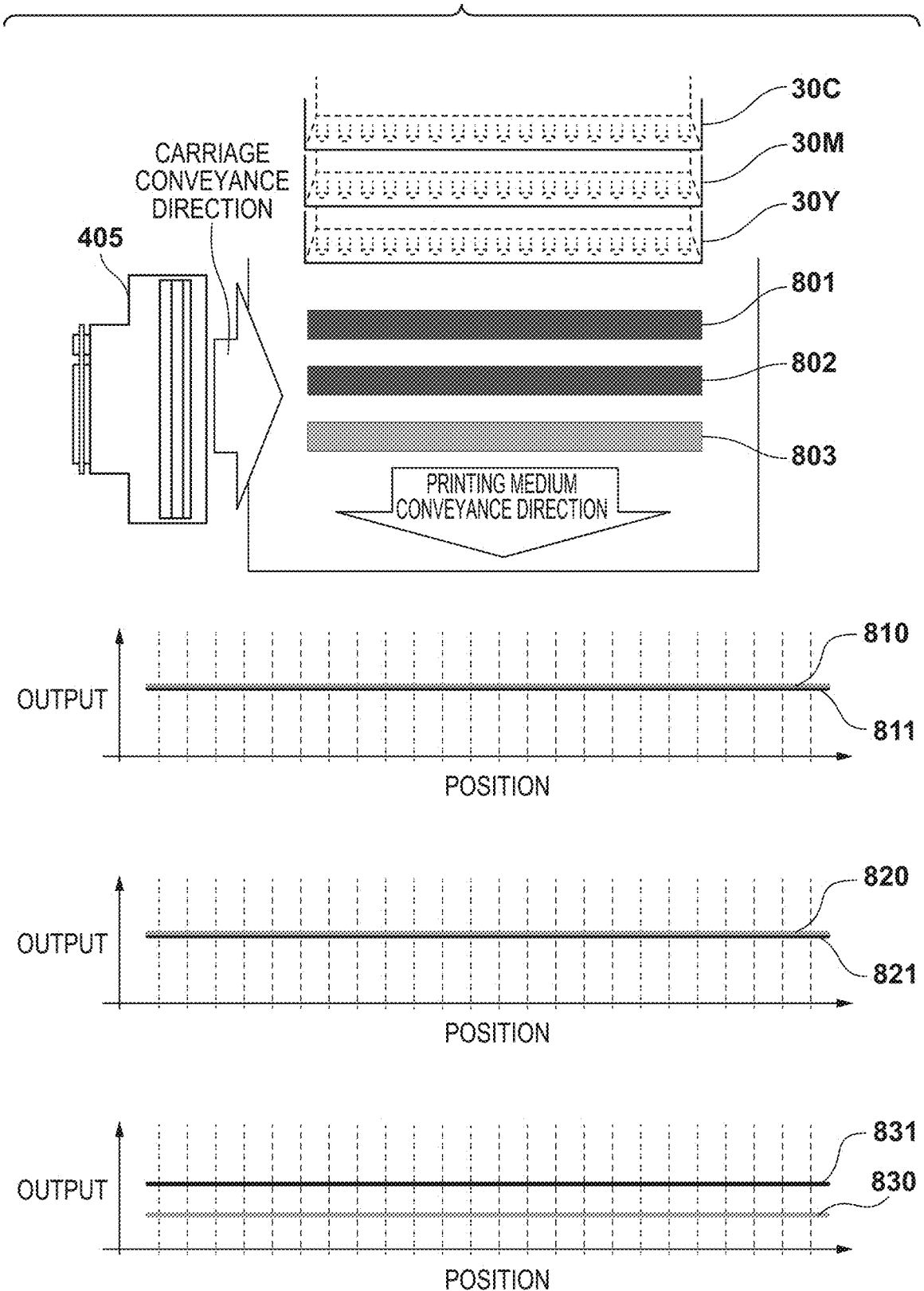
FIG. 8 shows a view and graphs for explaining the operation of the optical carriage.
Figure 9:
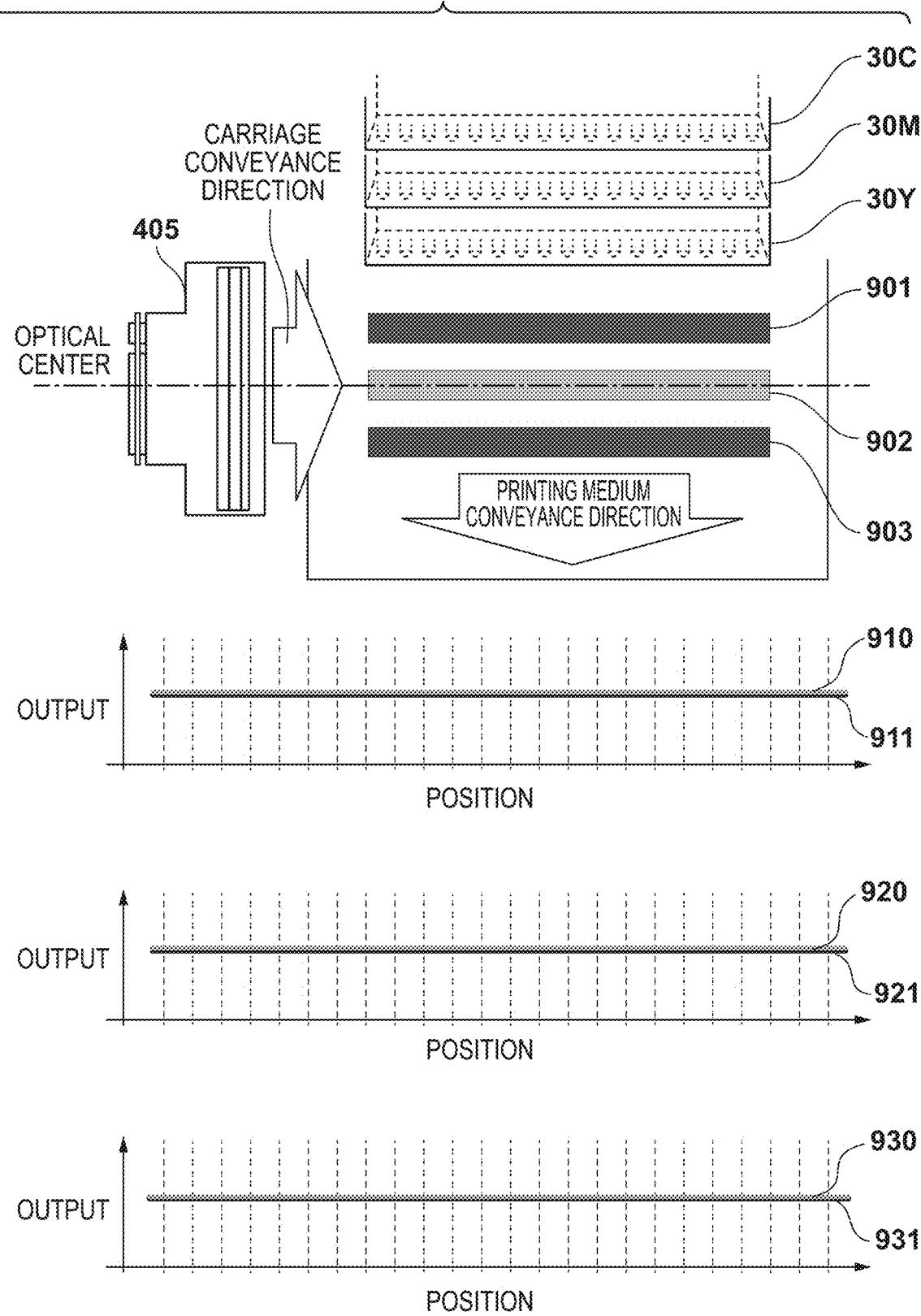
FIG. 9 shows a view and graphs for explaining the operation of the optical carriage.

The sensor 403 is a line sensor, and a plurality of photodiodes serving as scanning elements are arrayed in a direction crossing a nozzle array direction. Each of FIGS. 8 and 9 shows an example in which three inspection patches, respectively, corresponding to the three color inks are formed, and a case in which one of these colors is a specific color will be described as an example. A plurality of patches corresponding to the respective colors will be referred to as an inspection pattern altogether.

First, an arrangement shown in FIG. 11 will be described. At the time of an inspection, a patch 1101 is formed along a direction in which the optical carriage 400 moves. Here, one line of the patch 1101 in the conveyance direction of the optical carriage 400 is scanned by using one photodiode out of the plurality of photodiodes arrayed in the sensor 403. That is, one patch is read with one photodiode. Further, each of other patches is read with a photodiode different from the one photodiode. Therefore, a plurality of patches are read by different photodiodes, respectively. With such an arrangement, it is possible to reduce the influence of the variation in light distribution characteristics according to the positional relationship of the lens and the photodiodes in the sensor 403, as described above. Furthermore, it is also possible to reduce the influence of a variation in scanning characteristics of the individual photodiodes. This makes it possible to make a measurement condition on a sensor side constant by performing a scan while one photodiode moves in the nozzle array direction with respect to patches of the same color. Thus, it becomes possible to scan a patch density in the nozzle array direction appropriately. Moreover, it is possible to suppress the influence of the variation in scanning characteristics of the individual photodiodes by performing a scan a plurality of times while changing the relative positions of the sensor 403 and the inspection pattern. Furthermore, by causing a plurality of photodiodes, out of all the photodiodes continuously arranged in the conveyance direction of the printing medium, to scan the same patch and averaging these results, it is possible to reduce an influence on a measurement result given by a scanning error of one photodiode.

A description will be given next with reference to FIGS. 8 and 9 as further examples of this embodiment. FIG. 8 is an example in which patches of the respective three colors of cyan, magenta, and yellow (a cyan patch 801, a magenta patch 802, and a yellow patch 803) are formed. A problem that a difference occurs in an output value in accordance with the positional relationship between the photodiodes and the lens when a specific image is scanned will be described here. In this example, a case will be described in which there is no difference in output value according to the positions of the photodiode when a cyan image and a magenta image are scanned, and a difference occurs in an output value when a yellow image is scanned. Note that here, an ideal output value is output if there is neither variation in scanning characteristics of the photodiodes nor a difference in output value owing to an arranged position.

FIG. 8 shows an example in which the yellow patch 803 is scanned by using photodiodes at positions other than the center of the sensor 403 in the conveyance direction of the printing medium. It is also possible to suppress the influence of the variation of the individual photodiodes when a scan is performed by using a method of the embodiment shown in FIG. 8. As described above, the sensor of this embodiment does not cause an output difference when the cyan image and the magenta image are scanned. Thus, as shown in graphs, output values 810 and 820 obtained by scanning the cyan patch 801 and the magenta patch 802 are, respectively, the same as ideal output values 811 and 821. On the other hand, an output value 830 obtained by scanning the yellow patch 803 is influenced by a decrease in an output value depending on the positional relationship between the photodiodes and the lens, and is lower than an ideal output value 831. Even if a value is low, it can be used to create a correction table, to be described later as long as it is adequate as a detection value.

An arrangement for reducing an influence on an output value in a patch formed by the aforementioned specific color will be described next with reference to FIG. 9. In addition to the arrangement of FIG. 8, the arrangement of the patches corresponding to the respective ink colors is changed in FIG. 9. In FIG. 8, the formation order of the patches is decided in accordance with the arrangement of the printheads 30. In contrast, in the arrangement of FIG. 9, a patch corresponding to the specific color where a phenomenon of the decrease in output value described in FIG. 7 occurs is formed at a predetermined position of the optical carriage 400. More specifically, an inspection pattern is formed such that photodiodes located near the optical center of the sensor 403, that is, near a position facing the lens 402 scan a yellow patch 902. As a result, it becomes possible to suppress reflection of light from the yellow patch 902 on the surface of each photodiode owing to optical characteristics and suppress a decrease in output value. That is, as shown in FIG. 9, all output values 910, 920, and 930 obtained by scanning the respective patches are the same as ideal output values 911, 921, and 931.

Note that if there are a plurality of inks that are to be specific colors, patches corresponding to the plurality of inks may be arranged to be near the position of the optical center when they are scanned by the optical carriage 400. Moreover, if the inspection pattern is scanned divisionally a plurality of times, it may be scanned such that a patch of ink to be a specific color is positioned near the optical center at different timings. Note that ink of a color to be a specific color is defined in advance. In this embodiment, the patches are scanned in one movement of the optical carriage 400. It is possible to perform a scan more efficiently by scanning patches of a plurality of colors at once.

[Processing Sequence]

Figure 10:
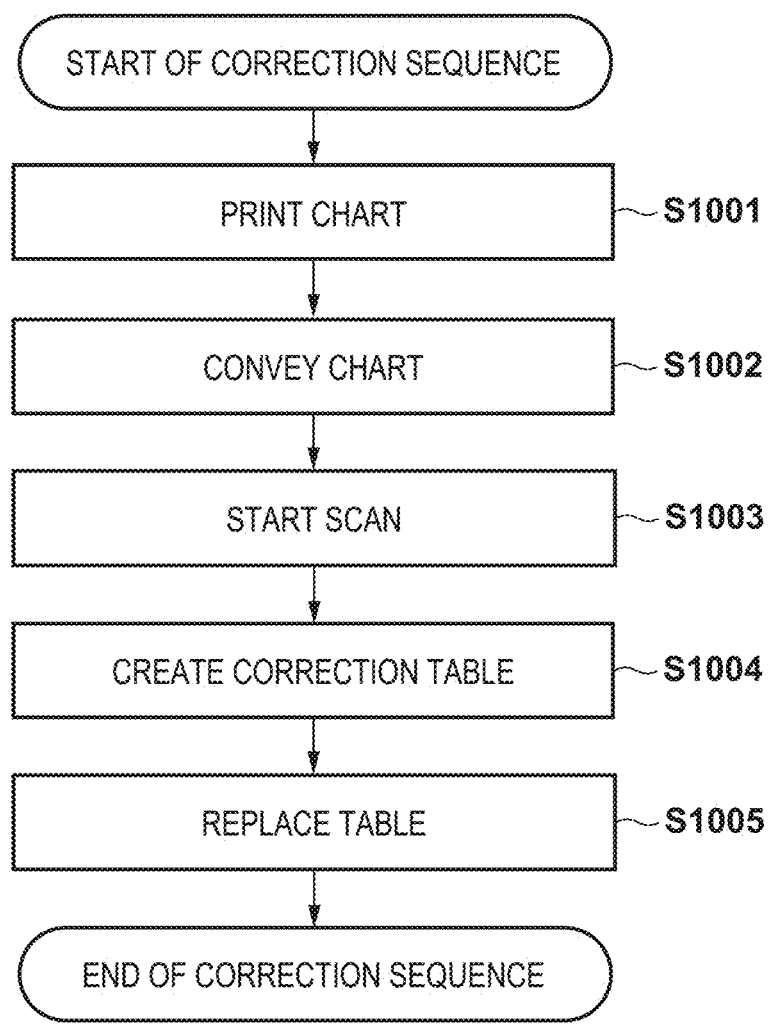
FIG. 10 is a flowchart showing an operation sequence.

A processing sequence in the example of FIG. 9 will be described below with reference to FIG. 10. In this embodiment, a description will be given assuming that a correction table for a positional shift or the like is formed, and various correction operations for print data are performed by forming an inspection pattern on the printing medium P and detecting the inspection pattern.

In step S1001, the inspection control unit 15E forms the inspection pattern on the printing medium via the printing control unit 15A. Here, the inspection pattern is formed such that the respective colors are arranged in a predetermined manner as described above. More specifically, the inspection pattern is formed such that the patch corresponding to the specific color is scanned at the position near the optical center of the optical carriage 400 when the printing medium is conveyed to a scanning position.

In step S1002, the inspection control unit 15E conveys a recorded product where the inspection pattern is formed to the scanning position of the optical carriage 400 via the conveyance control unit 15D.

In step S1003, the inspection control unit 15E causes the optical carriage 400 to scan the inspection pattern. As described above, the optical carriage 400 performs a scan while moving in a direction crossing the conveyance direction of the recorded product. In this embodiment, the optical carriage 400 is moved in a direction orthogonal to the conveyance direction. Note that out of reciprocal movement of the optical carriage 400, a scan may be performed in only one of a forward path and a backward path or in both. Moreover, a scanning target may be changed between the forward path and the backward path when a plurality of colors are handled. For example, when inks of six colors are handled in the optical carriage 400 capable of scanning inspection patterns of three colors at once, an arrangement that scans the inspection patterns of three colors as the first half in the forward path and scans the inspection patterns of three colors as the second half in the backward path may be adopted. In this case, the positions of the inspection patterns need to be adjusted by conveying the recorded product after the inspection patterns are scanned in the forward path.

In step S1004, the inspection control unit 15E creates a correction table based on a scanned signal for the main controller 13A. Note that the correction table created in this embodiment is a table used in so-called head shading (HS) processing for correcting unevenness in density caused by a variation in nozzle discharge characteristics.

As described above with reference to FIG. 1, the image processing unit 134 performs image processing for converting image data (here, RGB data) received by the control unit 13 into print data compatible with ink colors handled by the print unit 3. The print data of this embodiment are C data, M data, Y data, and K data, respectively, corresponding to inks of four colors of C, M, Y, and K. Then, the aforementioned HS processing is performed on this data corresponding to each ink color by using the correction table based on a scanning result generated in step S1004. Note that a unit for correcting each ink color data in the HS processing may be the unit of one nozzle or the unit of a plurality of nozzles. It is also possible to perform correction for the variation in nozzle discharge characteristics on the RGB data before converted into the respective data of C, M, Y, and K. In this case, a correction table is generated for the RGB data. In this case as well, correction may be performed in the unit of one nozzle or in the unit of the plurality of nozzles. Note that a table for performing correction may not be the correction table but may be in another data format.

In step S1005, the main controller 13A replaces a correction table that has already been stored with the correction table newly created in step S1004 in order to use it in a correction operation. Note that at the time of replacement, the correction table may be updated, or a past correction table may be kept continuously as a history. This processing sequence then ends.

As described above, with the arrangement of this embodiment, it becomes possible to reduce the influences of a variation in scanning characteristics of the scanning elements of the sensor and the variation in light distribution characteristics by scanning the inspection pattern or the like while moving the optical carriage in the direction crossing the conveyance direction of the printing medium. Furthermore, concerning a phenomenon in which an output value is decreased depending on the color of a scanned image and the positions of the scanning elements of the sensor, it is possible to suppress the decrease in the output value by adjusting the arrangement of patches of respective colors in an inspection pattern.

Note that in this embodiment, as shown in FIG. 11, the optical carriage moves in the direction crossing the conveyance direction and scans the outputs of all the nozzles with one photodiode corresponding to one color. It is therefore possible to scan an inspection pattern appropriately even without a line sensor in which photodiodes are arranged at a density corresponding to a nozzle resolution. Furthermore, it becomes possible to perform a scan in one movement even without a sensor corresponding to the number of arrayed nozzles, that is, a sensor corresponding to a length of the arrayed nozzles.

The description has been given by taking, as the example, the reduction optical system using the scanning sensor with one lens. However, the sensor may include a plurality of lenses. In a case in which the sensor includes the plurality of lenses as well, a positional relationship between a patch of a specific color and the sensor at the time of scan can be adjusted such that the patch can be scanned by a photodiode at a position corresponding to the lens. Note that although an output value obtained by scanning the specific color is decreased as a position of the photodiode is farther away from the position corresponding to the lens, a position at which the patch is scanned may not match a lens center if only in a range where a desired output value is obtained.

In the aforementioned example, a case has been described in which the specific color is yellow, and cyan and magenta are not specific colors. However, the present invention is not limited to this. It is found that a color which shows a decrease in output value is different when a scanning sensor is changed. Therefore, it is preferable that in accordance with a sensor to be used, the color which shows the decrease in output value is specified in advance, and a patch of the color is scanned near a position corresponding to the lens.

Figure 15:
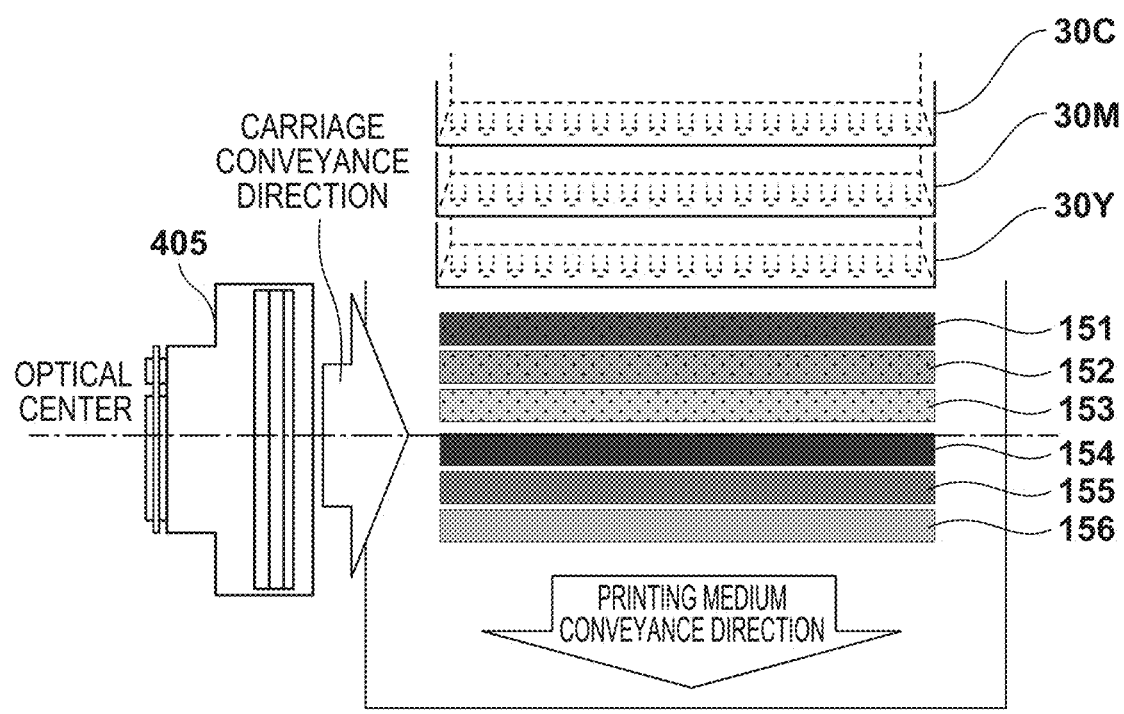
FIG. 15 is a view for explaining an operation in another example according to the first embodiment.

Another embodiment will be described next with reference to FIG. 15. FIG. 15 shows an example in which tone patches of a specific color and tone patches of a color other than the specific color are formed. FIG. 15 shows an example in which six patches are used. A high-density patch 151, a medium-density patch 152, and a low-density patch 153 are formed by a color other than the specific color. On the other hand, a high-density patch 154, a medium-density patch 155, and a low-density patch 156 are formed by the specific color.

In this embodiment, a case will be described in which the ratio of an output difference becomes low when the high-density patch of the specific color is scanned at the center, and the low-density patch is scanned at the end, and the ratio of the output difference becomes high when the low-density patch of the specific color is scanned at the center, and the high-density patch is scanned at the end. Note that here, an ideal output value is output if there is neither variation in scanning characteristics of photodiodes nor difference in output value owing to an arranged position.

FIG. 15 shows an example in a case in which the high-density patch 154 of the specific color is scanned by using photodiodes at positions near the center of a sensor (the optical center of an optical box 405 in FIG. 15), and the medium-density patch 155 and low-density patch 156 of the specific color and the high-density patch 151, medium-density patch 152, and low-density patch 153 of the color other than the specific color are scanned by using photodiodes at positions farther away from the center. Adopting this form has an advantage as follows.

Because it is possible to suppress the output difference even for the specific color by performing a scan near the center of the sensor, as described above, the output of the high-density patch becomes almost equal to an ideal output. A drop in detection density indicated by an output value when the photodiodes positioned on end sides are used becomes larger as a printing density is higher. However, the ratio of lowering from the ideal output in an entire output is lower in a case in which a patch is low in density than in a case in which the patch is high in density. Thus, an influence on a density indicated by the output value is suppressed even if the low-density patches are detected by using the photodiodes farther away from the center than the high-density patch 154. Then, as compared with each patch of the specific color, each patch of the color other than the specific color may have a smaller output difference or substantially have no output difference owing to the positions of the photodiodes. Therefore, in order to scan the high-density patch 151, medium-density patch 152, and low-density patch 153 of the color other than the specific color, it is possible to use the photodiodes farther away from the center than the photodiodes used to scan the high-density patch 154 of the specific color.

Figure 16A:
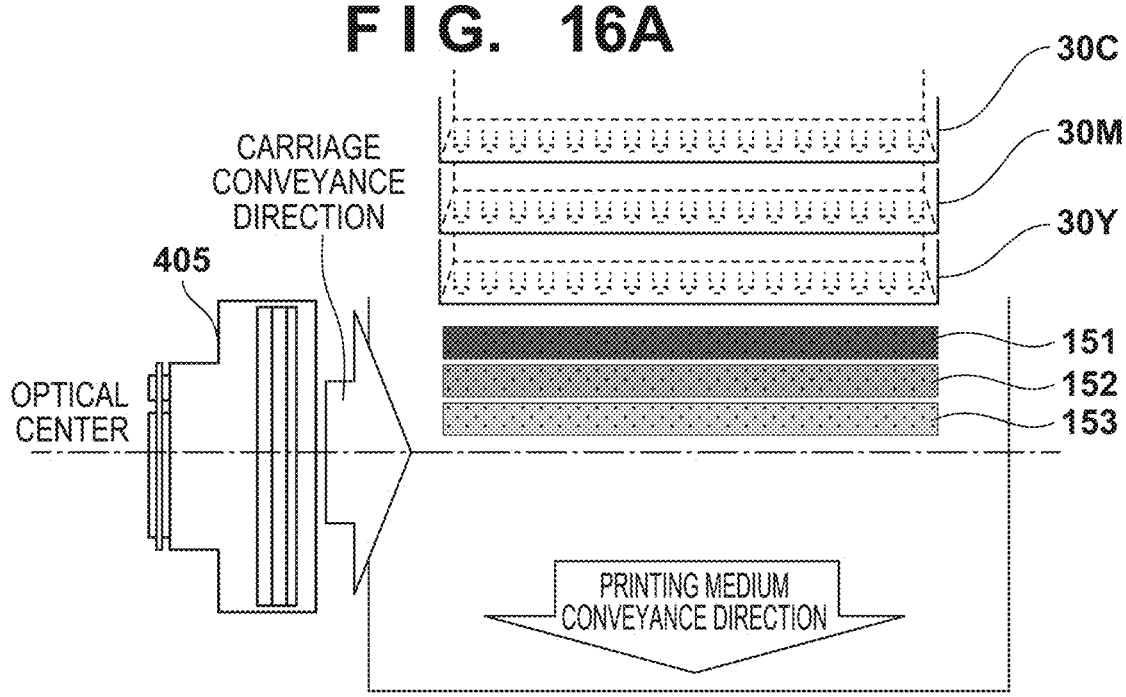
FIGS. 16A and 16B are views each for explaining another operation according to the first embodiment.
Figure 16B:
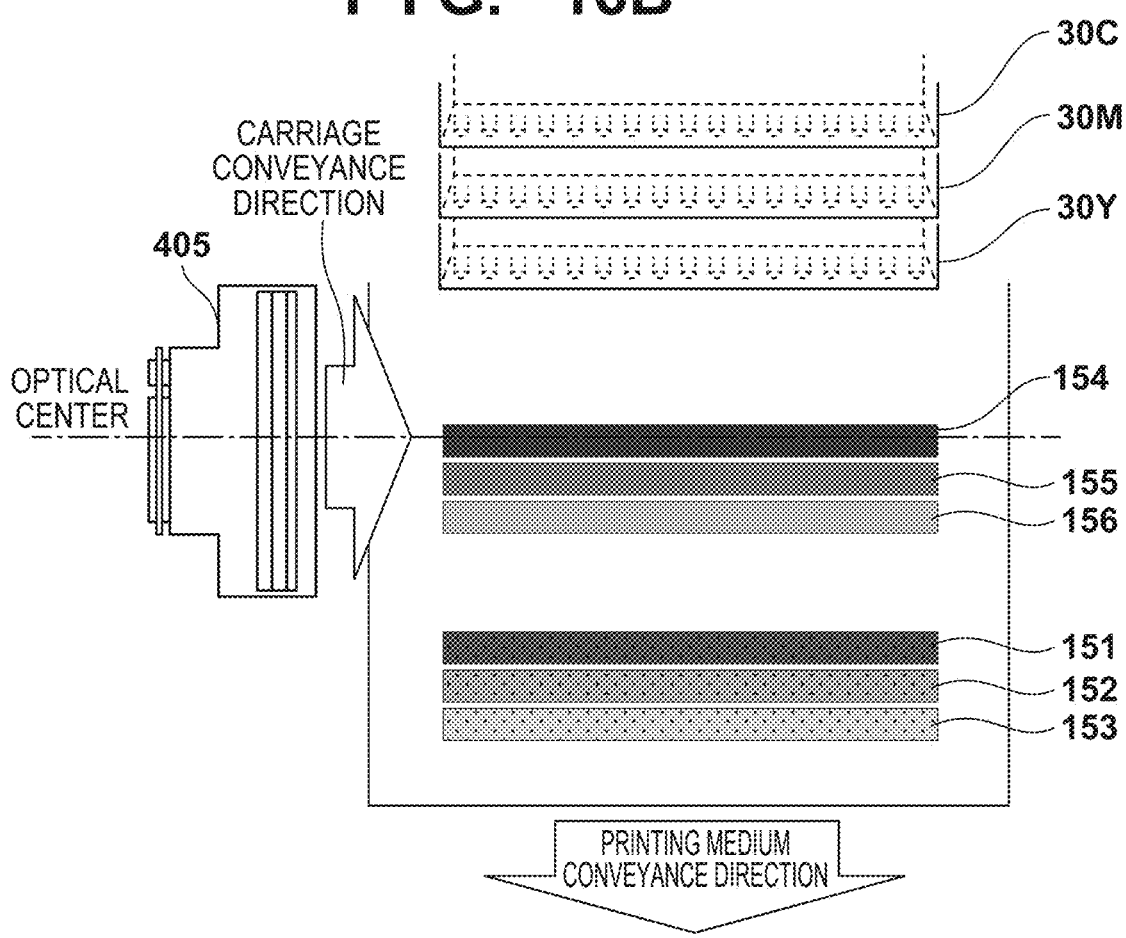

Another form will be described next with reference to FIGS. 16A and 16B. As shown in FIG. 16A, the line sensor scans the high-density patch 151, the medium-density patch 152, and the low-density patch 153 formed by the color other than the specific color in one scan. In addition to this, there is no patch used to create a correction table. It is possible to reduce scanning errors by scanning a plurality of patches of the same color at once as compared to scanning them individually a plurality of times. Subsequently, as shown in FIG. 16B, in the conveyance direction of the printing medium, the high-density patch 154, medium-density patch 155, and low-density patch 156 of the specific color are formed to be arranged in an area different from a range where the high-density patch 151, the medium-density patch 152, and the low-density patch 153 formed by the color other than the specific color are arranged. Then, the line sensor scans these high-density patch 154, medium-density patch 155, and low-density patch 156 of the specific color in next scan. At this time as well, the line sensor scans them in one scan. When the number of colors used in the printing apparatus is large, it is assumed that the line sensor has a difficulty in scanning patches of all colors in one scan. As a factor of this difficulty, for example, a case in which there is a restriction on the length of the line sensor or a patch size is assumed. Therefore, when the plurality of patches are formed, they need to be scanned individually in a plurality of scan operations by the line sensor. It is effective, however, to scan the plurality of patches of the same color at once.

Second Embodiment

The second embodiment according to the present invention will be described. Note that a description of parts common to the first embodiment will be omitted. In this embodiment, an example of a non-scaled optical method, or a so-called CIS (Contact Image Sensor) method using a CMOS or CCD scanning sensor as a line sensor will be described.

Figure 12:
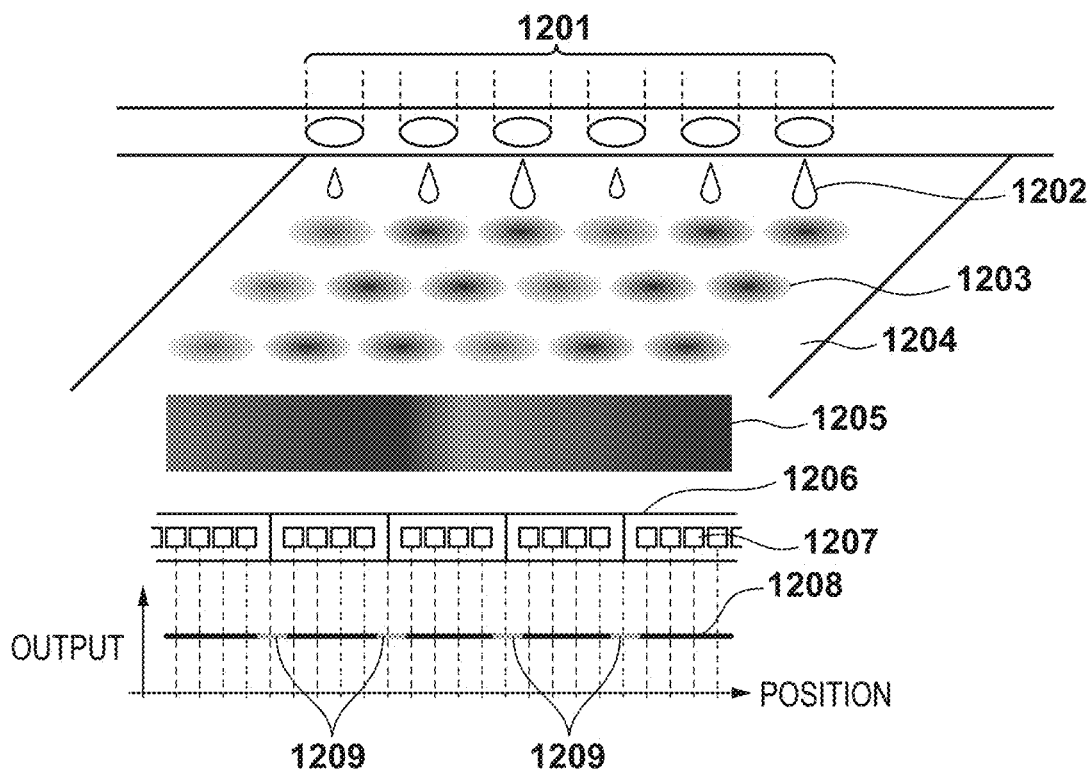
FIG. 12 shows a view and a graph for explaining a problem to be solved according to the second embodiment.
Figure 14:
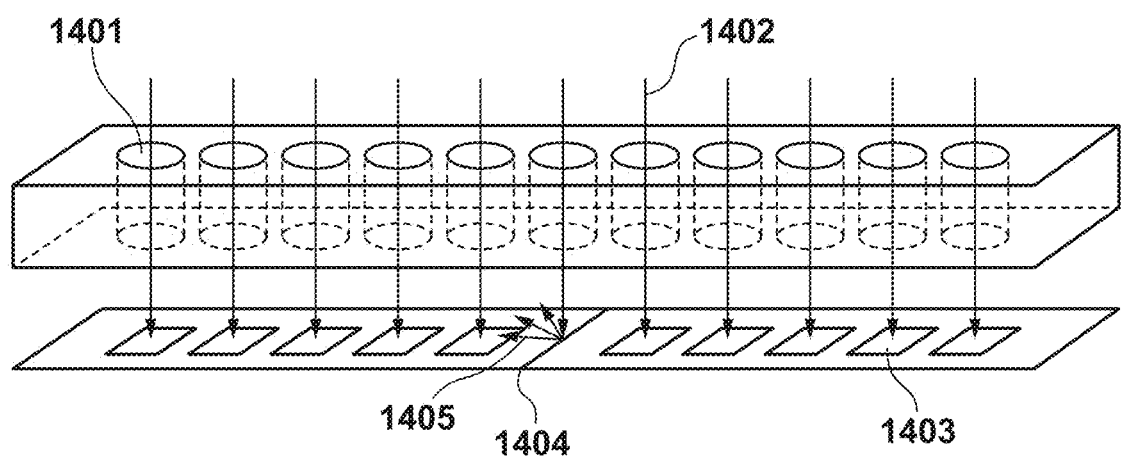
FIG. 14 is a view for explaining an operation according to the second embodiment.

As shown in FIG. 14, in the conventional CIS method, one lens, for example, a SELFOC® lens 1401 is arranged facing one photodiode 1403. Therefore, a lens array is formed in the CIS method. FIG. 12 shows a view and a graph according to the second embodiment. Note that there is a case incapable of arranging the photodiodes 1403 at each interval of predetermined intervals. In this case, if the lens array is formed in accordance with the resolutions of nozzles of printheads 30, it is impossible to scan an area corresponding to a connecting part 1404 where no photodiode is arranged as shown at part 1209 in FIG. 12, causing a missing pixel in output data. An incident light beam 1402 to the SELFOC® lens 1401 arranged at a position facing the connecting part 1404 where no photodiode 1403 is arranged becomes reflected light beams 1405 by the connecting part 1404.

Therefore, if the lenses are arranged at equal intervals when the lens array is arranged in association with the photodiodes 1403, not only the missing pixel is caused in the connecting part 1404 but also an error is caused in an output result by the reflected light beams 1405 generated in the connecting part 1404.

[Apparatus Arrangement]

Figure 13:
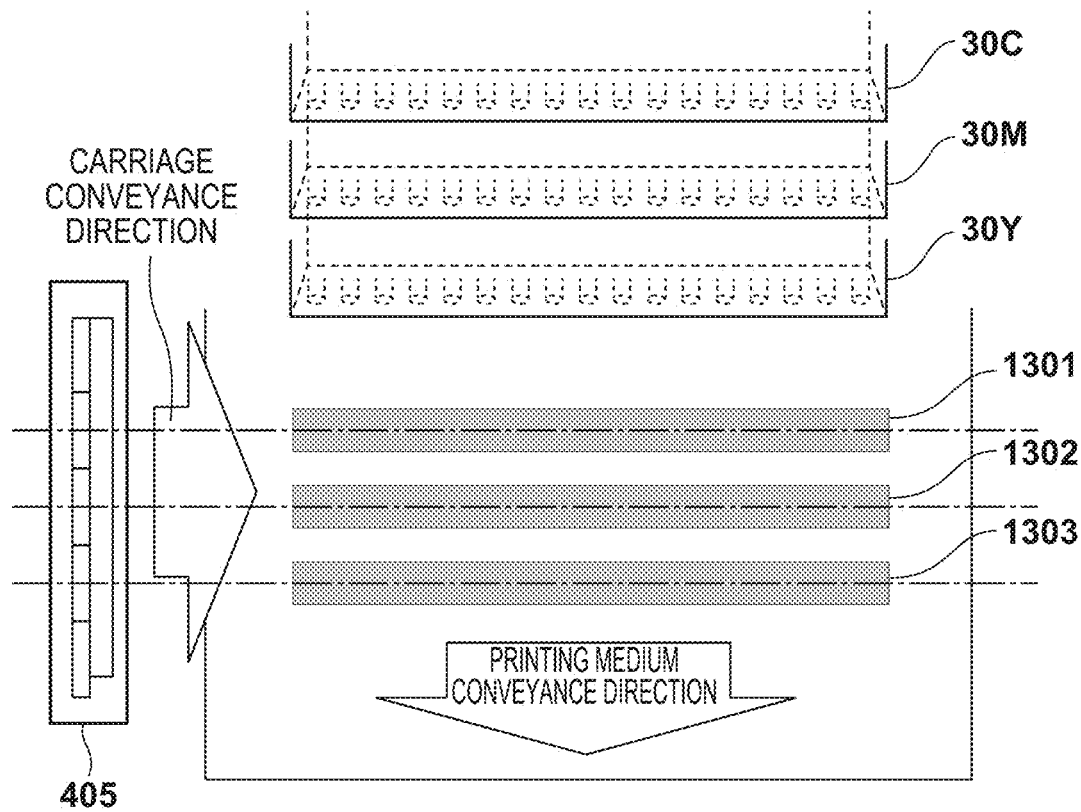
FIG. 13 is a view for explaining the operation of an optical carriage.

To cope with this, this embodiment has an arrangement as shown in FIG. 13. An arrangement in which a position where each of patches 1301 to 1303 of an inspection pattern is scanned becomes a position where a missing pixel is not caused by the connecting part in an optical carriage using the CIS is adopted. That is, an arrangement that scans the patches 1301 to 1303 by using areas where the photodiodes 1403 are arranged is adopted. When the inspection pattern is formed on a printing medium, the widths and intervals of the patches in a conveyance direction are adjusted so the patches do not fall on the area of the connecting part 1404 where no photodiode 1403 is arranged.

Then, as in the first embodiment, the optical carriage is moved in a direction crossing the conveyance direction at the time of scan. This makes it possible to obtain an accurate detection result without receiving any influence of the reflected light beams or missing pixel by the connecting part caused when the photodiodes are arranged. Of course, in the arrangement of this embodiment, it is also possible to perform correction in the unit of the desired number of nozzles while suppressing a decrease in output value in an image of a specific color as described in the first embodiment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-078480, filed Apr. 11, 2017, which is hereby incorporated by reference herein in its entirety.

What is claimed is:

1. A printing apparatus comprising:
   a printing unit including a plurality of orifices which discharge ink and which are arrayed in a first direction, the printing unit being configured to perform printing, based on image data indicating an image to be printed, by discharging the ink from the plurality of orifices to a printing medium conveyed in a second direction crossing the first direction, and to print an inspection pattern including a first patch, and a second patch, the second patch being one of (i) a different color than that of the first patch, and (ii) the same color as that of the first patch and different in density than that of the first patch, the first patch and the second patch each being printed so as to extend in the first direction on the printing medium by the plurality of orifices, wherein the first patch and the second patch are arranged relative to each other in the second direction;
   a scanning unit including a plurality of detection elements arranged in the second direction, the scanning unit being configured to scan the inspection pattern on the printing medium, in the first direction, by converging light beams reflected by the inspection pattern to a lens, and causing the plurality of detection elements to receive light beams passing through the lens and being diffused; and
   a correcting unit configured to correct, based on a scanning result of the inspection pattern by the scanning unit, the image data so as to reduce unevenness in density between areas of the image on the printing medium printed by the printing unit in a predetermined direction,
   wherein the scanning unit scans the first patch using a first detection element, of the plurality of detection elements, and scans the second patch using a second detection element which is farther away from the lens than the first detection element of the plurality of detection elements.

2. The printing apparatus according to claim 1, wherein a difference between a density indicated by a scanning output value obtained when the first patch is scanned by the first detection element and a density indicated by a scanning output value obtained when the first patch is scanned by the second detection element is greater than a difference between a density indicated by a scanning output value obtained when the second patch is scanned by the first detection element and a density indicated by a scanning output value obtained when the second patch is scanned by the second detection element.

3. The printing apparatus according to claim 1, wherein the first patch is a yellow patch, and the second patch is a patch of a color different from yellow.

4. The printing apparatus according to claim 1, wherein the scanning unit scans an object using a non-scaled optical method.

5. The printing apparatus according to claim 1, wherein the scanning unit scans the first patch and the second patch by one scan movement in the second direction.

6. The printing apparatus according to claim 1, wherein the printing is performed using different kinds of inks, the first patch is printed with only a first kind of ink, and the second patch is printed with only a second kind of ink, which is different from the first kind of ink.

7. A method of controlling a printing apparatus that includes a printing unit having a plurality of orifices which discharge ink and which are arrayed in a first direction, the printing unit being configured to perform printing, based on image data indicating an image to be printed, by discharging the ink from the plurality of orifices to a printing medium conveyed in a second direction crossing the first direction, and a scanning unit configured to include a plurality of detection elements arranged in the second direction, the method comprising:
   printing an inspection pattern including a first patch, and a second patch, the second patch being one of (i) a different color than that of the first patch, and (ii) the same color as that of the first patch and different in density than that of the first patch, the first patch and the second patch each being printed so as to extend in the first direction on the printing medium by the plurality of orifices, wherein the first patch and the second patch are arranged relative to each other in the second direction;
   scanning the inspection pattern on the printing medium, in the first direction, using the scanning unit, by converging light beams reflected by the inspection pattern to a lens, and causing the plurality of detection elements to receive light beams passing through the lens and being diffused, wherein the first patch is scanned using a first detection element, of the plurality of detection elements, and the second patch is scanned using a second detection element, which is farther away from the lens than the first detection element, of the plurality of detection elements; and correcting, based on a scanning result of the inspection pattern, the image data so as to reduce unevenness in density between areas of the image on the printing medium printed by the printing unit in a predetermined direction.

* * * * *